US000001434H

United States Statutory Invention Registration [19]

[11] Reg. Number: H1434

Cytron

[43] Published: May 2, 1995

[54] METHOD AND APPARATUS FOR CONFORMAL EMBEDDED CERAMIC ARMOR

[75] Inventor: Sheldon Cytron, Mountain Lakes, N.J.

[73] Assignee: The United States of America as represented by the Secretary of the Army, Washington, D.C.

[21] Appl. No.: 113,633

[22] Filed: Aug. 30, 1993

[51] Int. Cl.[6] ..... F41H 5/04

[52] U.S. Cl. ..... 89/36.02; 109/49.5

*Primary Examiner*—Stephen M. Johnson

[57] ABSTRACT

Armor and a method of making the same, where ceramic tile is placed in openings of a frame of material and layers of material are in contact with opposite sides of the frame and the tile, and wherein the material of both the frame and the layers is passed through a superplastic state by applications of heat and pressure.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

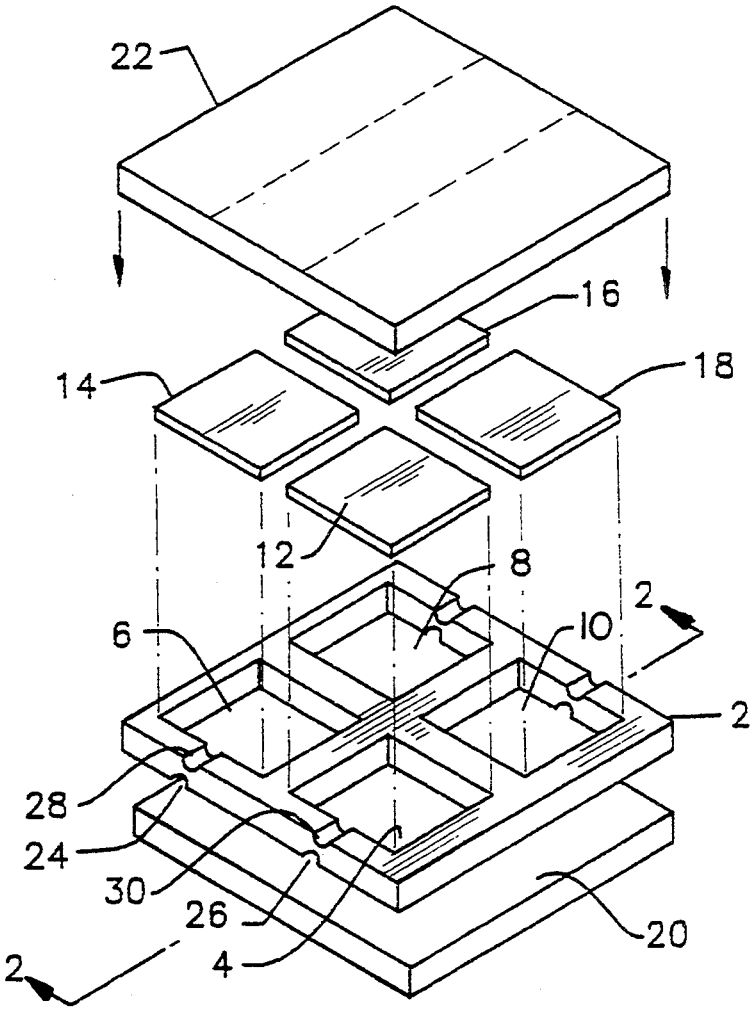

METHOD AND APPARATUS FOR CONFORMAL EMBEDDED CERAMIC ARMOR

GOVERNMENT INTEREST

The invention described herein may be manufactured, used, and licensed by or for the Government for governmental purposes without the payment to me of any royalty thereon.

FIELD OF THE INVENTION

This invention is in the field of armor for protection against projectiles.

BACKGROUND OF THE INVENTION

In view of their possessing greater hardness, higher strength and lower density than metals it would seem that ceramic materials could be used in fabricating armor. Unfortunately, however, they have very low tensile strengths that make them vulnerable to any residual or tensile stresses developed during manufacture, or in defeating a projectile, that cause them to crack so as to be ineffective as armor. The present methods of ensuring that ceramics in armor will not experience tensile stresses are not reliable, are often very cumbersome and costly to implement and generally entail resorting to complicated structures not readily conformable to the shape of the vehicle or structure that needs the protection. One procedure calls for precision machined ceramic tiles and cavities in armor metal blocks. The ceramic filled cavities are then covered over with a top plate which is then generally welded to the armor metal block. Normal temperature excursions and differences in thermal expansion coefficients between the ceramic and the surrounding metal will open up a gap between these materials. Reflected tensile stresses will arise within the ceramic at this gap during ballistic impact and thereby normally lead to degraded performance of the ceramic.

Other procedures may take extensive effort to ensure that the ceramic material is in a compressive state by either wrapping the ceramic monoblocks in fiber reinforced organic composite casings before placing in the metal armor cavities, or by packing/pouring sealant compounds in the air gaps before sealing up the armor blocks. These techniques of trying to ensure that no tensile stresses are generated are also not reliable, very time consuming to implement, and ballistically inefficient. Resorting to another procedure, that of casting the metal around the ceramic often leads to shrinkage gaps at the ceramic monoblocks upon cooling the casting. Good processing control to fully eliminate these types of gaps have so far been difficult to establish. It is well known that certain metals as well as ceramics having fine grain structure can be made to exhibit what is called a superplastic property; i.e. it is pliant, by applying proper amounts of strain while within a given range of temperatures. Using a superplastic preconditioned 7475 aluminum alloy as an example, superplasticity can be made to occur by heating it to a temperature between 510° C. and 520° C. and slowly applying pressure at 0.05 MPa/minute that corresponds to a superplastic strain rate of 0.0001/seconds until a maximum pressure of 0.7 MPa is reached. The alloy is then cooled to room temperature while the maximum pressure is maintained. A pressure of 1000 p.s.i. equals 6.9 MPa's (megapascals). Other materials require different pressures and temperatures. In accordance with this invention ceramic tiles are located within openings formed in a layer of material, hereinafter referred to as a picture frame that exhibits superplasticity when subjected to appropriate strain while at an appropriate temperature. Preferably, layers of like material are placed in contact with opposite sides of the tiles and the picture frame so as to form an assembly in which the tiles are completely enclosed.

An aspect of this invention is the maintenance of the maximum pressure for a period of time so as to permit improved diffusion bonding of the outer layers to the tile and the picture frame. The bonding to the tile can be improved by first subjecting the tile to ion implantation or plasma enhanced coating procedures so as to provide a metallic surface.

Another aspect of this invention is to subject the assembly to further heat treatment to convert the SPF (superplastic forming) microstructure of the material of the picture frame and the layers into a higher strength microstructural form. This provides additional armor protection without any loss of mass efficiency. This post heat treatment temperature is less than that used in creating the superplastic condition to ensure that there is no diminution of the compressive stress on the embedded ceramic tile, A less preferable armor structure of this invention that is still better than the prior art is one in which the outer layers of the assembly are eliminated in which case the pressure is applied by gas to an assembly that is enclosed within an evacuation bag.

One of the significant advantages of this invention is the fact that tile is embedded in metal that can be bent so as to provide a desired shape. The required procedures are performed to create the required compressive forces on the tile that eliminate tensile forces that may result from the impact of a penetrator. This result obtains because the metal is such that it acquires a superplastic state when subjected to changing pressure at a desired temperature. When in this state, the metal becomes intimately connected to the tile, and contractive forces occur as it is cooled down.

BRIEF DESCRIPTION OF THE DRAWINGS

Various embodiments of the invention are described below with reference to the drawings, in which like items are indicated by the same reference designation, wherein.

DETAILED DESCRIPTION OF THE INVENTION

Figure 1:
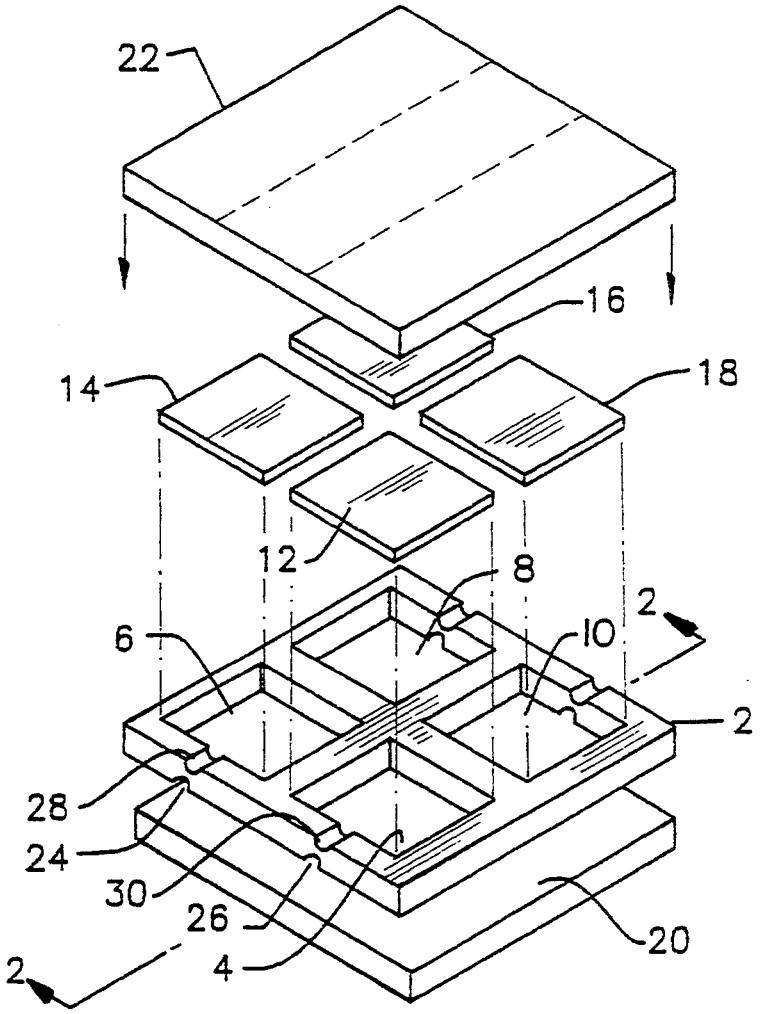
FIG. 1 is an exploded isometric view of an assembly in which tile is embedded in accordance with this invention.

In FIG. 1, the exploded isometric view of an assembly of the invention shows a picture frame 2 having a number of rectangular openings 4,6,8, and 10 therein into which tiles 12,14,16, and 18 are respectively adapted to fit. Layers 20 and 22 are on opposite sides of the picture frame 2. Channel 24 is formed in the bottom of the picture frame 2 so as to communicate with the openings 6 and 8, and another channel 26 is formed in the bottom of the picture frame 2 so as to communicate with the opening 4 and 10. Similarly, a channel 28 in the top of the picture frame 2 communicates with the openings 6 and 8, and a channel 30 in the top of the picture frame 2 communicates with the openings 4 and 10.

Figure 2:
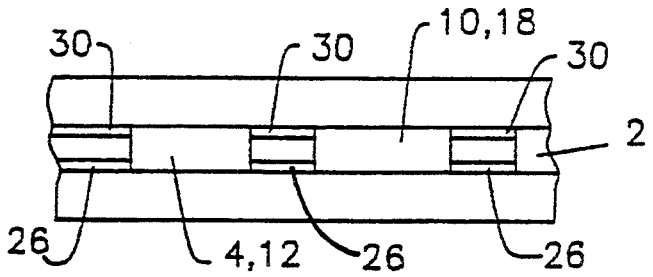
FIG. 2 is a cross section taken along 2—2 of the assembly of FIG. 1 when the components of FIG. 1 are compressed together.

When the components of FIG. 1 are vertically compressed together, a cross section 2—2 of FIG. 1 will appear as shown in FIG. 2, wherein the layers 20 and 22 are in intimate contact with the picture frame 2 and the ceramic tiles 4,6,8, and 10.

The material from which the picture frame 2 and the layers 20,22 are made is such that it will produce a superplastic state when at a selected temperature and subjected to increasing pressure. When in this state, the material flows like gum so that pressure supplied to the layers 20 and 22 by a press brings them into intimate contact with the surface of the tiles and forces the picture frame 2 into intimate contact with the edges of the tiles. When the temperature is reduced to ambient and the pressure is removed, the intimate contact is maintained. This is important because gaps tend to permit tensile forces to be applied to the tile by the impact of a projectile, and because tile has a low tensile strength, it breaks up.

Metals such as aluminum and steel as well as ceramic are known to exhibit superplastic properties. Any material having this capability can be used in the invention. The material is also available in powdered form.

During the process, air that might otherwise interfere with the bonding of the tile to the picture frame 2 and the layers 20 and 22 is withdrawn by coupling a vacuum pump to the channels 24,26,28, and 30.

In accordance with an aspect of the invention, the bonding between the tiles 4,6,8, and 10 to the metallic material of the picture frame 2 and the layers 20 and 22 is improved by metallizing the surfaces of the tile by well known ion implantation or plasma enhanced coating techniques.

Figure 3:
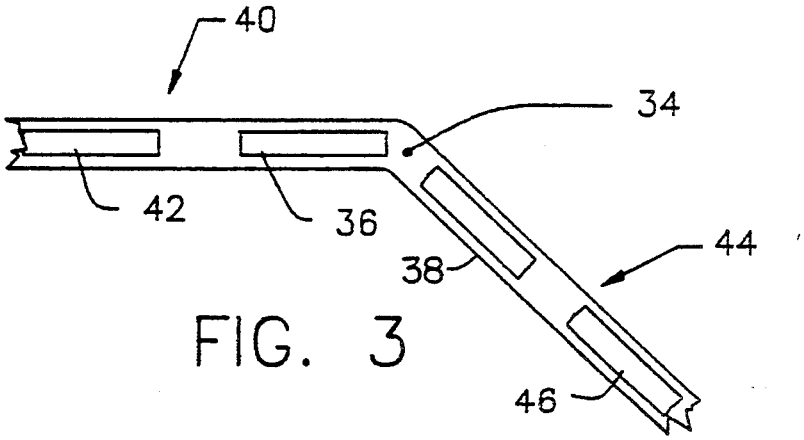
FIG. 3 is a cross section of an assembly having tile embedded therein in accordance with this invention illustrating an angular surface formed therewith.

Reference is made to FIG. 3 showing an assembly of this invention that is bent about an axis 34 that lies between tiles 36 and 38 so as to form a section 40 having tiles 36 and 42 embedded therein that is at an angle with respect to a section 44 having tiles 38 and 46 embedded therein. If the armor is to have a gradually curved surface, the tiles can be made to have a reduced dimension in at least the direction along the curve so as to form a series of small chords. In addition, the outer surfaces of the assembly could be subjected to the pressure required by the process by a press having curved surfaces. Alternatively, the structure could be bent to the desired curvature and placed in an evacuated bag that is subjected to air pressure.

Figure 4:
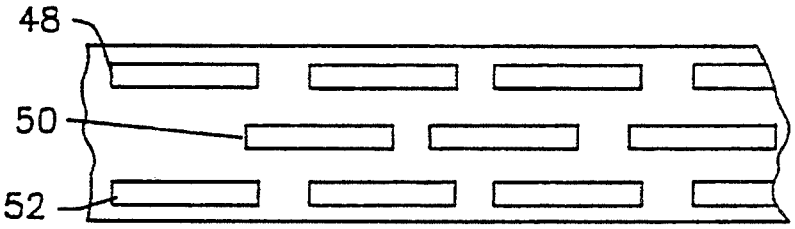
FIG. 4 is a cross section of layers of assemblies having tile embedded therein in accordance with this invention.

In order to simplify the drawings, an assembly embodying the invention has been shown in FIG. 1 to be comprised of a single layer of ceramic tile, but in order to armor the spaces between tiles, multiple layers of tile such as 48, 50, and 52 of FIG. 4 are used. In making this structure, only one layer such as 20 or 22 of FIG. 1 is between the layers 48 and 50 and 50 and 52.

What is claimed is:

1. A method for forming armor comprising:

forming an assembly by surrounding at least one ceramic tile with material that becomes superplastic when it is subjected to increasing pressure while at a selected temperature;

heating the assembly to a given temperature;

subjecting the assembly to a pressure that increases to a given value;

maintaining said given temperature and said given pressure for a period of time;

reducing the temperature while maintaining the given pressure; and removing the pressure.

2. A method as set forth in claim 1, wherein:

a vacuum is drawn around the ceramic tile.

3. A method as set forth in Claim 1, further comprising:

heating said assembly a second time to a second given temperature;

water quenching the assembly; and aging the assembly by maintaining it at a third temperature for a second period of time.

4. A method as set forth in claim 1 wherein said material is metal.

5. An armor assembly comprising:

a frame of material having a plurality of openings;

a plurality of ceramic tiles in each of said openings, respectively;

layers of material in contact with each side of said frame and said ceramic tiles; and said frame and said layers being comprised of material that has been subjected to heat and pressure so that they have passed through a superplastic forming and diffusion bonding state.

6. An armor assembly comprising:

material that has been passed through a superplastic state; and ceramic tile embedded in said material.

7. An armor assembly as set forth is claim 6, wherein said tile has been metallized before it was embedded.

* * * * *